(12) United States Patent
Bernier

(10) Patent No.: US 11,327,872 B2
(45) Date of Patent: May 10, 2022

(54) TEST INSTRUMENT FOR SOFTWARE COMMUNICATIONS ARCHITECTURE DEVICE TESTING

(71) Applicant: VIAVI SOLUTIONS INC., San Jose, CA (US)

(72) Inventor: Steve Bernier, Gatineau (CA)

(73) Assignee: VIAVI SOLUTIONS INC., San Jose, CA (US)

(*) Notice: Subject to any disclaimer, the term of this patent is extended or adjusted under 35 U.S.C. 154(b) by 66 days.

(21) Appl. No.: 16/866,167

(22) Filed: May 4, 2020

(65) Prior Publication Data

US 2020/0356464 A1 Nov. 12, 2020

Related U.S. Application Data

(60) Provisional application No. 62/844,455, filed on May 7, 2019.

(51) Int. Cl.
*G06F 11/00* (2006.01)
*G06F 11/36* (2006.01)

(52) U.S. Cl.
CPC ...... *G06F 11/3664* (2013.01); *G06F 11/3612* (2013.01); *G06F 11/3684* (2013.01); *G06F 11/3688* (2013.01)

(58) Field of Classification Search
CPC ............ G06F 11/3612; G06F 11/3664; G06F 11/3684; G06F 11/3688
See application file for complete search history.

(56) References Cited

U.S. PATENT DOCUMENTS

| | | | |
|---|---|---|---|
| 10,372,587 B1* | 8/2019 | Sternberg | G06F 21/755 |
| 11,080,168 B1* | 8/2021 | Choudhury | G06F 11/22 |
| 2006/0015674 A1* | 1/2006 | Murotake | G06F 9/4401 |
| | | | 711/101 |
| 2006/0129887 A1* | 6/2006 | Hu | G06F 11/26 |
| | | | 714/25 |
| 2009/0144594 A1* | 6/2009 | Chakraborty | G01R 31/318533 |
| | | | 714/732 |
| 2011/0202301 A1* | 8/2011 | Kim | H04L 43/50 |
| | | | 702/108 |
| 2017/0125073 A1* | 5/2017 | Palmer | G06F 11/3409 |
| 2018/0101472 A1* | 4/2018 | Wiechowski | G01M 17/00 |
| 2019/0179727 A1* | 6/2019 | Bouissou | G06F 11/3612 |
| 2020/0026860 A1* | 1/2020 | Aldridge | G06F 11/3664 |
| 2021/0224160 A1* | 7/2021 | Shoji | G06F 9/453 |

* cited by examiner

*Primary Examiner* — Joshua P Lottich
(74) *Attorney, Agent, or Firm* — Mannava & Kang, P. C.

(57) ABSTRACT

A test instrument is operable to test Software Communications Architecture (SCA) devices. The test instrument can identify components of an SCA application loaded on an SCA device being tested, and create a test point in the SCA application that may be between components of the SCA application. The test instrument can receive and analyze signals generated at the test point to identify malfunctioning components within the SCA application.

16 Claims, 7 Drawing Sheets

TEST INSTRUMENT FOR SOFTWARE COMMUNICATIONS ARCHITECTURE DEVICE TESTING

RELATED APPLICATION

The present disclosure claims priority to U.S. Provisional Application No. 62/844,455, filed May 7, 2019, the disclosure of which is hereby incorporated by reference.

BACKGROUND

The Software Defined Radio (SDR) Forum, working in collaboration with the Institute of Electrical and Electronic Engineers (IEEE) P1900.1 group, has worked to establish a definition of SDR that provides consistency and a clear overview of the technology and its associated benefits. The definition of an SDR is as follows: "Radio in which some or all of the physical layer functions are software defined." As stated by the wireless innovation forum, at www.wirelessinnovation.org, a radio is any kind of device that wirelessly transmits or receives signals in the radio frequency (RF) part of the electromagnetic spectrum to facilitate the transfer of information. In today's world, radios exist in a multitude of items such as cell phones, computers, car door openers, vehicles, and televisions. Traditional hardware-based radio devices limit cross-functionality and can only be modified through physical intervention. This results in higher production costs and minimal flexibility in supporting multiple waveform standards. By contrast, SDR technology provides an efficient and comparatively inexpensive solution to this problem, allowing multimode, multi-band and/or multi-functional wireless devices that can be enhanced using software upgrades. For example, an SDR is a radio communication system where components that have been traditionally implemented in hardware (e.g. mixers, filters, amplifiers, modulators/demodulators, detectors, etc.) may instead be implemented by software running on a general purpose processor or an embedded system. For example, signal processing may be performed by a general purpose processor or other type of processor, rather than being done in special-purpose hardware, such as hardware mixers, filters, amplifiers and other electronic circuits. Such a design produces a radio which can receive and transmit widely different radio protocols (sometimes referred to as waveforms) based solely on the software used.

The Software Communications Architecture (SCA) is an open standard that describes a standardized architecture framework for the development of "Software Defined" systems, including SDRs. The SCA is published by the Joint Tactical Networking Center (JTNC), and the most recent version is version 4.1. The SCA was originally developed by the U.S. military's Joint Tactical Radio Systems (JTRS) to standardize the way in which SDRs for the U.S. armed forces were to be built. Since then, the SCA has evolved with the input of the international radio community led by the Wireless Innovation Forum (WInnF) into SCA version 4.1.

The SCA aims to promote software reuse by enhancing portability, interoperability and configurability of software applications for SDRs. SCA applications are safeguarded from changes in the underlying system software/hardware by abstracting the deployment platform. The SCA does so by providing an SCA Operating Environment (OE) that abstracts platform specifics like the Operating System (OS), processor and inter process communication.

Traditional testing of a radio commonly analyzes a signal that is being produced by the radio as it comes out via the antenna port. For example, a testing instrument is connected to the antenna port of the radio being tested. The testing instrument receives the signal transmitted by the radio being tested, and analyzes the signal to detect problems with the radio. For example, the testing instrument may determine whether the signal is transmitted at the correct frequency or whether the data was corrupted during the transmission. If a problem is detected, there is often very little that the testing instrument can do to diagnose the problem. This is at least partially because the radio is a "black box" to the testing instrument and/or the tester. In other words, the internals of the radio may be proprietary or undocumented, making it difficult to determine the cause of the problem. This is akin to trying to diagnose the problem with a car that won't start without being able to look under the hood. As a result, diagnosing of a problem with a radio may rely heavily on the experience of a human tester which itself is highly susceptible to misdiagnosis.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
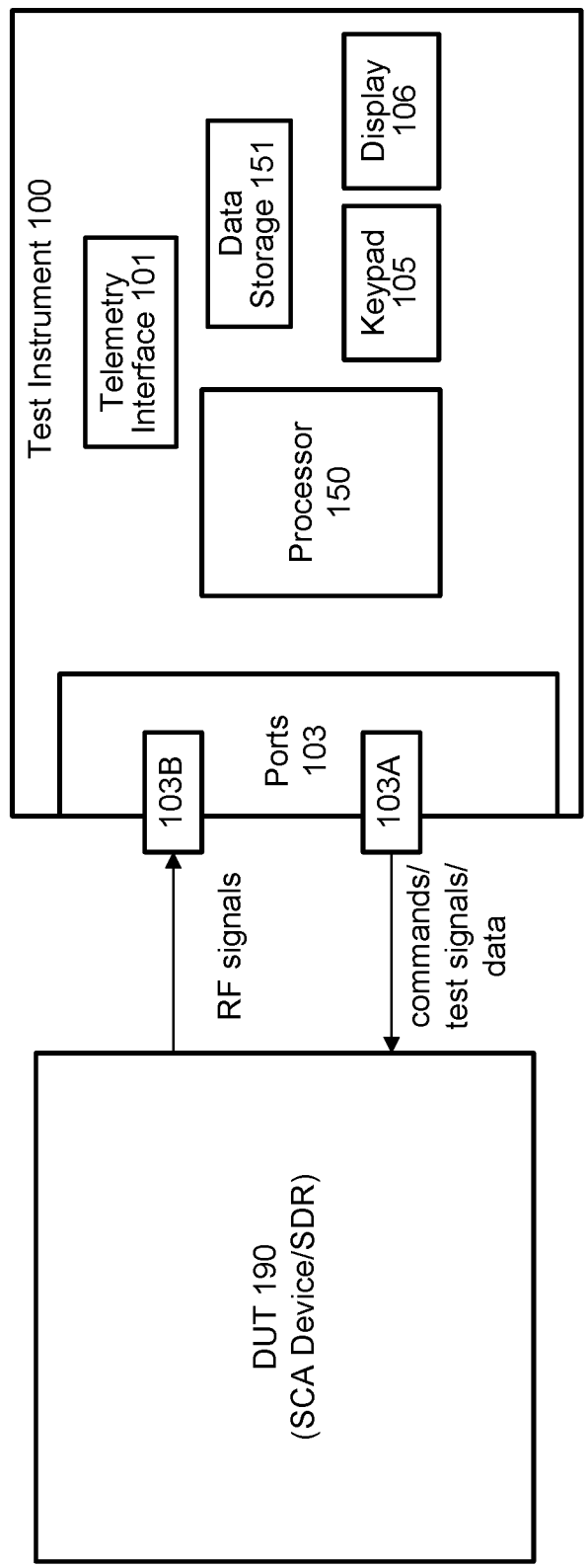
FIG. 1 shows a block diagram of a test instrument connected to a device under test (DUT), according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent, however, that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, and the term "including" means including but not limited to. The term "based on" means based at least in part on.

According to an example of the present disclosure, a test instrument is operable to perform software application component testing of SCA devices. A description of an SCA device that is testable by the test instrument is provided below, followed by a description of the test instrument that is operable to perform the testing.

An SCA device is any device that implements and complies with the SCA. Examples of an SCA device may include an SCA radio, such as a two-way handheld radio, SCA radar, etc. The SCA is an open standard architecture published by the Joint Tactical Networking Center (JTNC) at www.jtnc.mil. Version 4.1 is the most current version of the SCA. The SCA defines a standard way for radios to instantiate, configure, and manage waveform applications running on their hardware platform.

The SCA separates waveform software from the underlying hardware platform, facilitating waveform software portability and re-use to avoid costs of redeveloping waveforms. A waveform, in the field of SCA, is a collection of software modules (also called SCA components) that provide wireless services, so from a radio designer's perspective, the waveform is the key application in a radio. A waveform is also referred to herein as an SCA application. An SCA device includes a core framework (CF) that defines the essential "core" set of open software interfaces and profiles that provide for the deployment, management, interconnection, and intercommunication of software application components of a waveform in an embedded, distributed-computing communication system. An SCA device also includes standard waveform application program interfaces (APIs) that define the key software interfaces that allow a waveform and hardware platform to interact. SCA use the APIs to separate a waveform from the underlying hardware platform, facilitating waveform portability and re-use to avoid costs of redeveloping waveforms.

The architecture described by the SCA was developed to assist in the development of Software Defined Radios (SDRs). Accordingly, an SCA device may include an SDR. An SDR is a radio in which some or all of the physical layer functions are software defined, and a radio is any kind of device that wirelessly transmits or receives RF signals. Accordingly, an SCA device with an SDR includes, among other components, an antenna, a hardware RF transmitter/receiver to communicate RF signals, and a processor executing software to perform some level of the physical baseband processing. For example, an SCA device may be a wireless device including an SDR. The SDR includes a radio communication system having one or more radio components (e.g. mixers, filters, amplifiers, modulators/demodulators, detectors, etc.) that are implemented by software running on a general purpose processor or an embedded system.

An SDR is reprogrammable to change its functionality. For example, an SCA device including an SDR may be programmed with different waveforms (i.e., SCA applications) to perform different functionalities. For example, a typical communications soldier out in the battlefield today might be carrying between 20 to 30 radios, because different radios are needed to implement different protocols to talk to different services and forces. Instead of carrying around 20 to 30 radios, the soldier may use an SCA device comprised of a handheld two-way radio that includes an SDR that is reprogrammable with different SCA applications that implement the required protocols to talk to different services and forces. Of course, the SDR may be programmed with other SCA applications to perform different functionalities.

The test instrument, for example, is a device that is separate from the SCA device that is being tested by the test instrument. In an example, the test instrument may be a portable device that is connectable to one or more SCA devices to be tested through wired or wireless ports. The test instrument can connect to an SCA device to be tested to identify an SCA application running on the SCA device and to identify SCA components of the SCA application running on the SCA device. The SCA components, for example, resemble software integrated circuits and each component has a set of defined functionality, performance, and input/output. The test instrument may introspect the SCA device to obtain a list of the SCA components inside the SDR of the SCA device. The test instrument allows a user to select one or more SCA component to test, and generates a display of the output of a selected SCA component. The test instrument not only analyzes the output of the SCA components, but it also can inject signals, such as reference signals, impaired signals, etc., into the SCA component to analyze the output of the SCA component for testing.

Being able to look at the various signal transformations performed by SCA components inside the SCA device before the aggregated signal is transmitted via the antenna port provides tremendous ability to debug a problem. A tester can view the input and/or output signals of any of the SCA components of an SCA application inside the SDR, which facilitates the ability to identify which of the many transformations performed by any of the SDA components is faulty.

FIG. 1 shows a high-level block diagram of a test instrument 100, according to an example of the present disclosure. The test instrument 100 may include components other than shown. The test instrument 100 may include ports 103 that may include wired or wireless physical interfaces 103 for connecting the test instrument 100 to one or more devices under test (DUTs). The DUTs may include SCA devices. The SCA devices, for example, include SDRs and SDR software applications comprised of components. In the example shown, the test instrument 100 is connected to DUT 190 via connectors 103a-b. Port 103a may be info/control connector for sending commands to the DUT 190 and/or for receiving data from the DUT 190, and connector 103b may be used to receive signals that are output from the DUT 190. The output of one or more of the components of an SDR software application running on the SCA device may be received via one or more of the connectors 103. The test instrument 100 may include more than two connectors.

The test instrument 100 includes a processor 150. The processor 150 may include any suitable hardware to perform the operations of the test instrument 100 described herein. The operations include measuring and testing operations and determining performance parameters of a DUT that may be connected to the test instrument 100. The hardware of the test instrument 100, including the processor 150, may include a hardware processor, microcontroller, a General Purpose Processor (GPP), a digital signal processor (DSP), an application specific integrated circuit (ASIC), a field programmable gate array (FPGA) or other programmable logic device, discrete gate or transistor logic, discrete hardware components, or any combination thereof designed to perform the functions and methods described herein. In an example, one or more of the functions and operations of the test instrument 100 described herein may be performed by the processor 150 or other hardware executing machine readable instructions stored in a non-transitory computer readable medium, which may comprise RAM (random access memory), ROM (read only memory), EPROM (erasable, programmable ROM), EEPROM (electrically erasable, programmable ROM), hard drives, flash memory, or other types of storage devices, which may be volatile and/or nonvolatile.

The test instrument 100 includes data storage 151 which may store any information used by the test instrument 100 and may include memory or another type of known data storage device. The data storage 151 may store measurements or parameters determined by or used by the test instrument 100. The data storage 151 may include a non-transitory computer readable medium storing machine-readable instructions executable by processor 150 to perform operations of the test instrument 100.

The test instrument 100 may include a telemetry interface 101 for connecting to a telemetry channel, such as a Wi-Fi interface, Bluetooth interface, cellular interface or another network interface. The test instrument 100 may connect to a remote device via the telemetry interface 101.

The test instrument 100 includes a user interface which may include a keypad 105 and/or a display 106. The display 106 may include a touch screen display. A user may interact with the test instrument 100, such as to enter information, select operations, view measurements, view interference profiles, etc., via the user interface.

Figure 2:
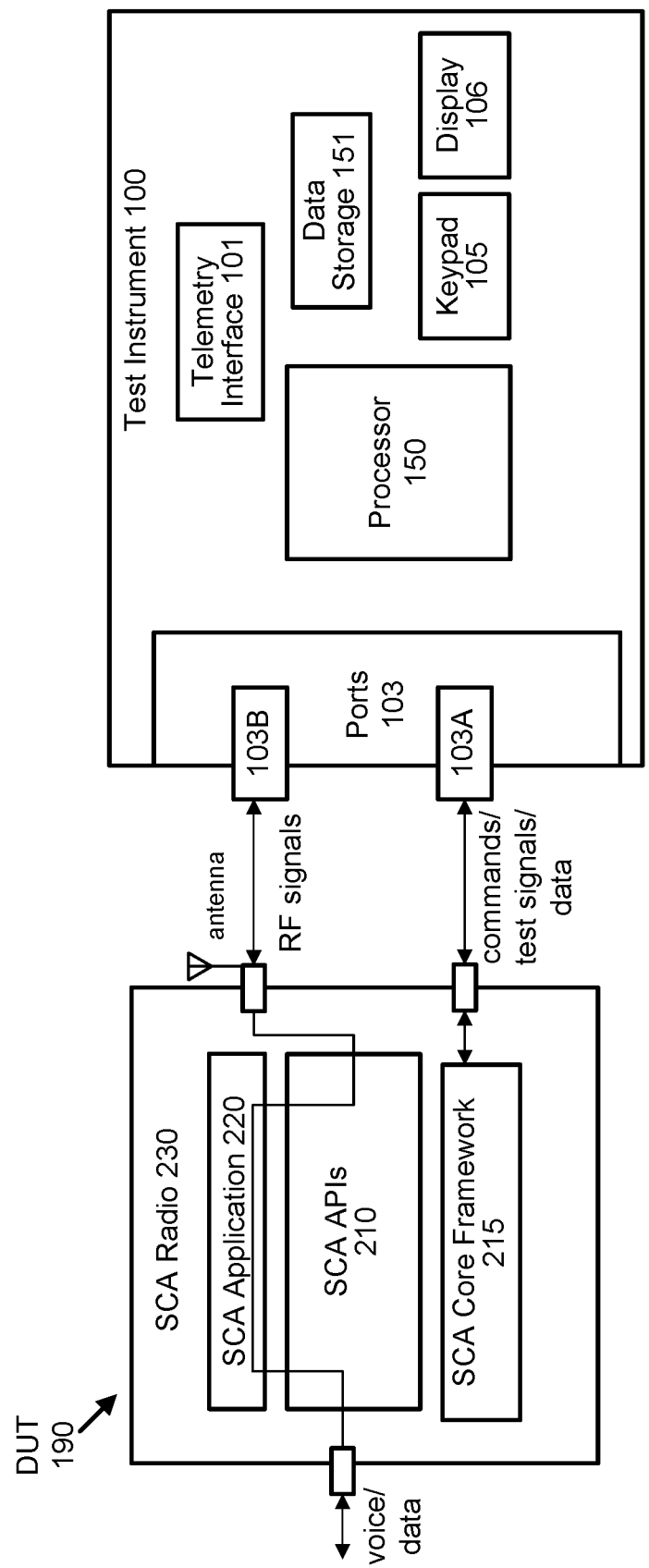
FIG. 2 shows a block diagram of a test instrument connected to an SCA radio, according to an example of the present disclosure.

FIG. 2 shows an example where the DUT 190 is an SCA radio 230.

For example, the SCA radio 230 may be a handheld SCA radio that can send or receive voice and/or data signals. In an example, a user may speak into a microphone in the SCA radio 230, and the SCA radio 230 may transmit an RF signal including the speech over a particular frequency via the antenna to another radio. Also, the SCA radio 230 may receive RF signals, which may include speech, via the antenna and play the speech via a speaker and/or display the speech in text on a display of the SCA radio 230. In an example, the SCA radio 230 may also send and receive data, such as Ethernet data, via the antenna, and the data may be output via a port of the SCA radio 230 onto a local area network connected to the port.

As shown in FIG. 2, the SCA radio 230 includes the SCA architectural framework as defined by the SCA open standard. Layers of the SCA architectural framework are shown, and include the SCA core framework 215 and SCA APIs 210. The SCA core framework 215 defines the essential core set of open software interfaces and profiles that provide for the deployment, management, interconnection, and inter-communication of software application components in an embedded, distributed-computing communication system. In this sense, interfaces defined in the SCA are part of the core framework 215. The core framework 215 can also receive commands from the test instrument 100 to launch an SCA application, which is software, launches binaries, provide metadata for SCA components of the SCA application, insert input signals into an SCA component, receive an output signal from an SCA component, etc.

The SCA APIs 210 provide two types of APIs. The two types of APIs include APIs defined in the SCA related to deployment and control of software, and domain-specific APIs such as defined by the Joint Tactical Radio System (JTRS) maintained and improved by the Joint Tactical Network Center (JTNS). The domain-specific APIs of the SCA APIs 210 define the key software interfaces that allow the SCA application 220 and hardware of the SCA radio platform to interact. The SCA APIs 210 separate the software from the underlying hardware platform, facilitating waveform software portability and re-use to avoid costs of redeveloping waveforms. The SCA APIs 210 are referred to as SCA devices in the SCA standard and are defined as software components that p provide access to the system hardware resources which implement the base device interfaces. Some examples of the SCA APIs 210 include an audio API, push to talk (PTT) API, GPS API, voice encoding API, etc.

The SCA application 220 is a software application that performs a desired operation of the SCA radio. The SCA application 220 is programmed by a developer and must comply with the requirements set forth in the SCA standard. The SCA application 220 is comprised of software components, referred to herein as components. The SCA application 220 is a collection of one or more components which provide a specific service or function. Each component can potentially communicate with other components to perform application functions. The components may use the APIs of the SCA APIs 210 to perform their functions. Their functions may include transformations performed on a digital signal. Examples are described below.

Figure 3:
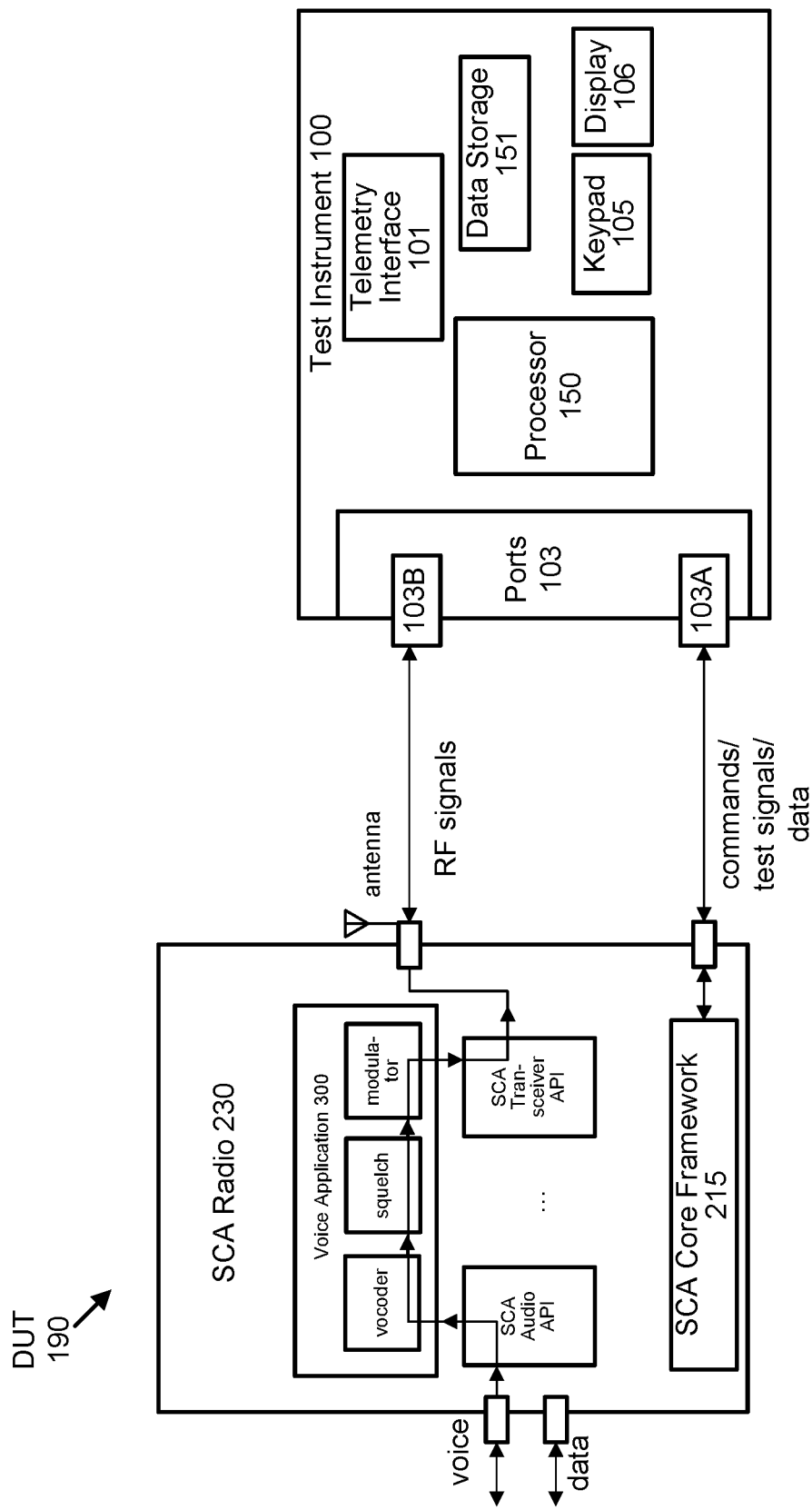
FIG. 3 shows a block diagram of a test instrument connected to an SCA radio including a voice application, according to an example of the present disclosure.
Figure 4:
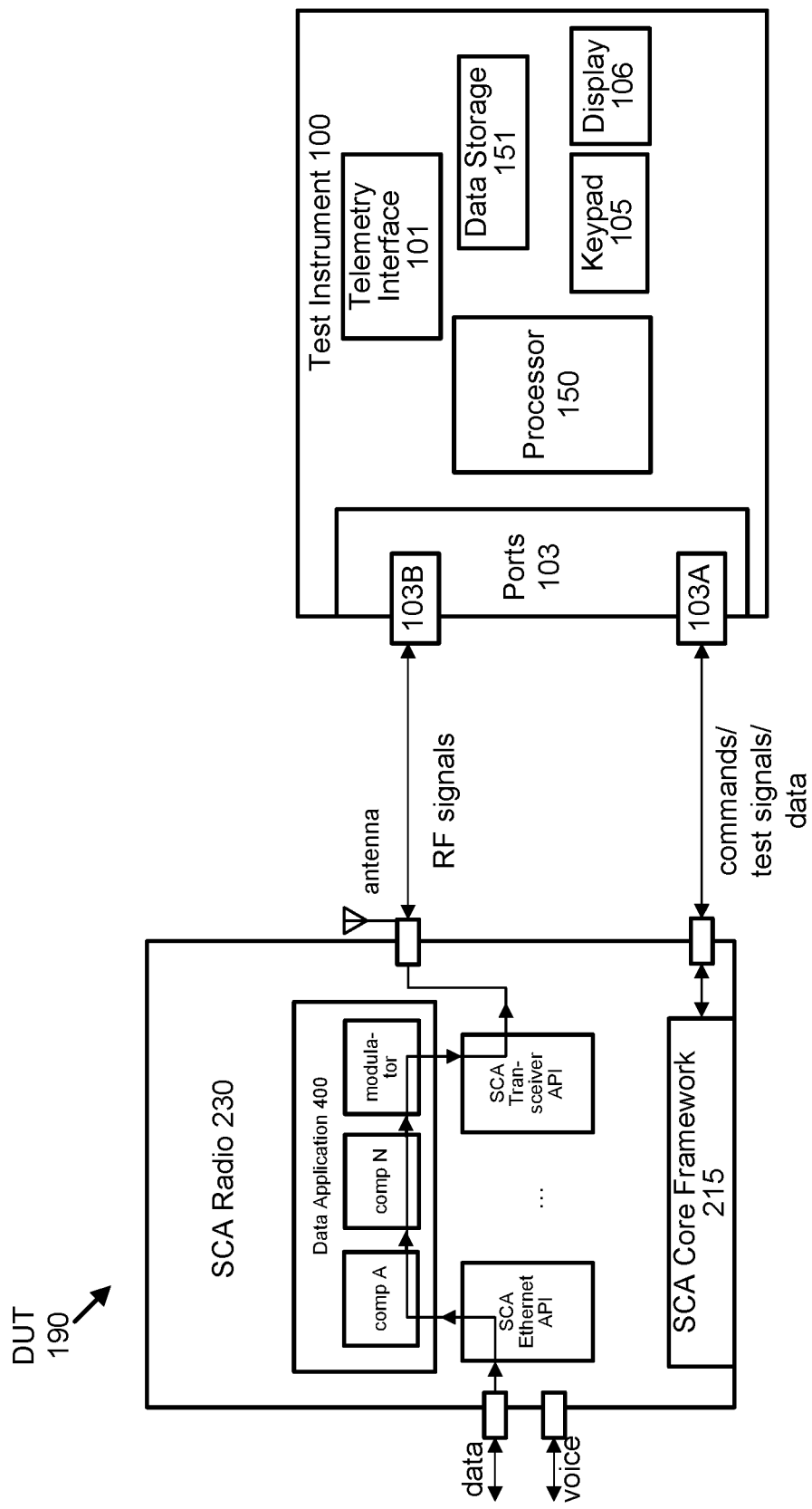
FIG. 4 shows a block diagram of a test instrument connected to an SCA radio including a data application, according to an example of the present disclosure.

FIGS. 3 and 4 show different examples of the SCA application 220 and the SCA APIs 210. FIG. 3 shows an example whereby the SCA application 220 is a voice application 300. The voice application 300 includes components for a voice encoder (vocoder), squelch and modulator. The components use APIs, such as the SCA audio API, SCA transceiver API, etc., to execute their functions. For example, the user speaks into a microphone of the SCA radio 230 to communicate with another SCA radio. The speech is digitized and encoded by the vocoder component of the voice application 300. A squelch tone is added by the squelch component, and the modulator component, via the SCA transceiver API, modulates the signal to generate an RF signal for transmission via the antenna to another radio.

To test the SCA radio 230, the test instrument 100 may send commands via connector 103A to the SCA core framework 215 to determine the components of the voice application and to determine how they are connected. A graphical user interface (GUI) may be displayed on the display 106 that shows the components of the voice application 300 and how they are connected. The user may create test points in the voice application 300 via the GUI. For example, a test point may be created at the output of the vocoder and another test point may be created at the output of the squelch component. The test instrument 100 can send commands to the SCA core framework 215 to launch the voice application 300, and the test instrument 100 can send reference signals to a component via the SCA core framework 215 to generate an output signal at each of the test points, such as at the output of the vocoder or at the output of the squelch component. The test instrument 100 may receive the signals from the test points via the connector 103A and/or the connector 103B. In an example, the digital signals output at each test point are transmitted to the test instrument 100 via the connector 103A. Modulated RF signals may be received via the connector 103B.

The test instrument 100 can display the received signals and compare the received signals from the test points to pre-determined signals of what the output signals should be at the test points. This information can be used to diagnose detected problems. For example, if a detected problem is garbled speech being received by a receiving radio, then the output at the test points can identify which component may be malfunctioning. This is a vast improvement over conventional testing, whereby the test instrument may only have access to the aggregated signal being output from the antenna, and it is difficult to determine which component may be malfunctioning from just looking at the aggregated signal being output from the antenna.

FIG. 4 shows an example whereby the SCA radio 230 includes a data application 400 that allows the SCA radio 230 to connect two networks. For example, the two networks may be separated by miles on a battle field or in a first responder situation. The SCA radio 230 may be used to transmit Ethernet frames from one network to another network via RF. The SCA radio 230 may have a connector that can connect to a local area network at a first location via an Ethernet cable. The SCA radio 230 receives Ethernet frames, and the data application 400 includes components that capture the Ethernet frames and perform sophisticated digital modulation to transmit the Ethernet frames over RF to another SCA radio connected to the second network at another location.

The test instrument 100 can be used to test the data application 400. For example, via commands sent to the core framework 215, the test instrument 100 introspects the SCA radio 230 to determine the components of the data application 400 and how they are connected. Test points are created to test the output of components, and the signals output at the test points are captured and may be analyzed and displayed to detect malfunctioning components.

Figure 5:
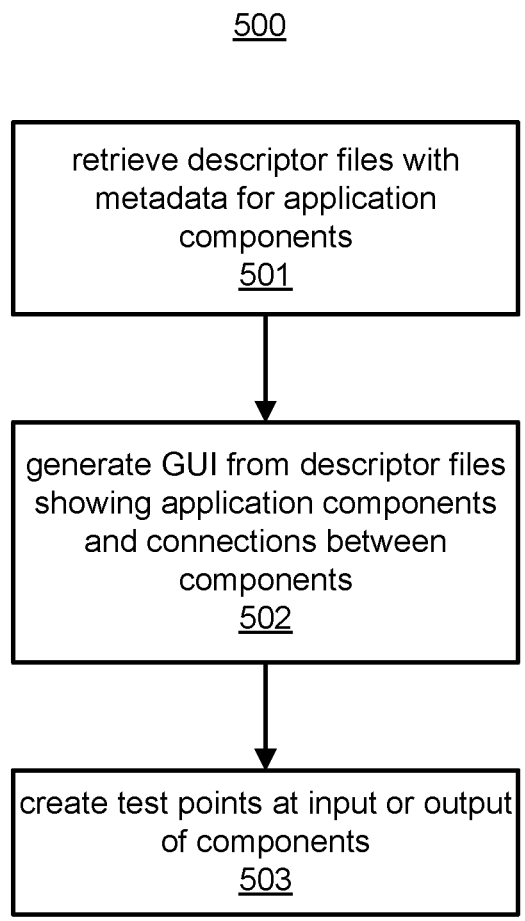
FIG. 5 shows a method for creating test points in an SCA application via a test instrument, according to an example of the present disclosure.
Figure 6:
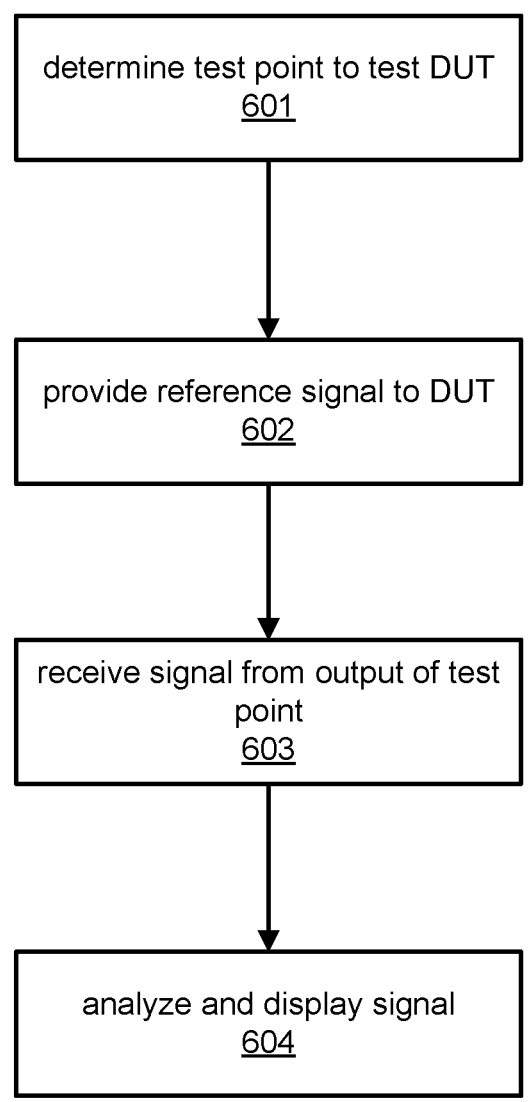
FIG. 6 shows a method for analyzing displaying signals at test points via a test instrument, according to an example of the present disclosure.

FIGS. 5 and 6 show methods that may be performed by the test instrument 100. FIG. 5 shows a method 500 for creating test points in an SCA application, such as the voice application 300 or the data application 400, loaded on an SCA device. At 501, the test instrument 100 retrieves descriptor files with metadata describing application components. For example, the SCA DUT stores descriptor files that describe the components in a way that allows the core framework 215 to run the SCA application. The test instrument 100 sends commands to the SCA DUT to retrieve the descriptor files from the SCA DUT. At step 501, the test instrument 100 can receive the metadata from the DUT, however, it is also possible that a user, such as the SCA application developer, or another device can provide that metadata to the test instrument 100.

For example, the SCA DUT stores descriptor files which describe the composition and configuration of the components of the SCA application. The descriptor files describe the identity, capabilities, properties, and inter-dependencies of the hardware devices and the components and the inputs and outputs of the components. For example, the descriptor files for an SCA application provide identification of the software (title, author, etc.) as well as the name of the code file (executable, library or driver), implementation details (language, OS, etc.), configuration and initialization properties (contained in a Properties File), and dependencies.

Also, the descriptor files may be part of a stored software profile for the SCA application. The software profile may include Software Assembly Descriptor (SAD) file that references (directly or indirectly) one or more of the descriptor files. The SAD and the descriptor files define required connections between components of the SCA application, defines needed connections to devices and services, provides additional information on how to locate the needed devices and services, defines any co-location (deployment) dependencies, and identifies a single component within the application as the assembly controller. The test instrument 100 can send commands via the port 103A to the SCA core framework 215 of the SCA radio 230 to the retrieve the descriptor files and the SAD. The processor 150 of the test instrument 100 can parse the SAD and descriptor files to identify all the components of the SCA application and how they are interconnected as well as other information. This information may be used to generate a GUI of the components as shown and discussed with respect to FIG. 7.

At 502, the test instrument 100 generates a display, which in an example is a GUI, from the descriptor files that shows the application components and connections between the components. For example, the test instrument 100 parses the descriptor files to determine the components of the SCA application and how the components are connected. This may include the connections of the input and output of each component to another component.

Figure 7:
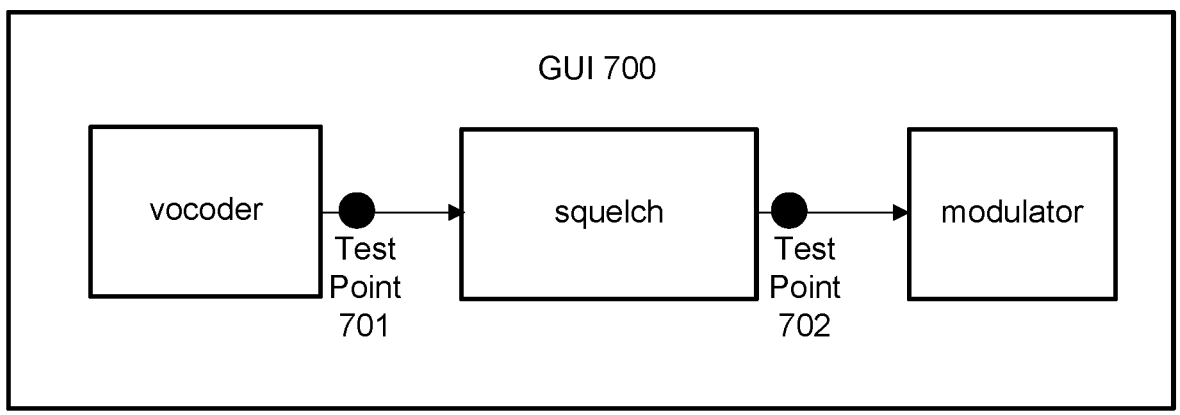
FIG. 7 shows an example of graphical user interface for creating test points, according to an example of the present disclosure.

The test instrument 100 generates a diagram of the interconnected components, for example, in a GUI. For example, as shown in FIG. 7, GUI 700 is generated and displayed, and shows connections of the components of the voice application 300 (e.g., without test points 701 and 702 because it is prior to generating the test points).

At 503, the test instrument 100 creates one or more test points at inputs and/or outputs of the components. For example, a test point may be selected by a tester via the GUI. For example, a test point 701 shown in FIG. 7 may be created at the output of the vocoder, and another test point 702 may be created at the output of the squelch component of the voice application 300. The test points 701 and 702 are created based on the user input, and generating the test points 701 and 702 may include storing metadata describing each test point, so the test points 701 and 702 can cause the output signals at the test points 701 and 702 to be sent to the test instrument 100 for analysis. In an example, the test instrument 100 receives a selection of an input or an output of a component via the GUI 700. For example, a selection of the output of the vocoder is received, such as via a user click on the output of the vocoder when the GUI 700 is displaying a test point creation screen. Then, the test point 701 is generated and displayed in the GUI 700. The test instrument 100 may store test point metadata describing the test point 701, such that data can be gathered and redirected or copied from the test point 701 and transmitted to the test instrument 100. For example, the test point metadata may include a unique identifier of the test point 701 and a location of the test point 701 in terms of input or output of a component of the voice application 300, such as output of the vocoder.

FIG. 6 shows a method 600 for analyzing displaying signals at test points, such as the test points 701 and 702. At 601, the test instrument 100 determines a test point for a DUT (e.g., SCA device), such as described with respect to the method 500. For example, the test instrument 100 creates test points 701 and 702 such as described with respect to the method 500. At 602, the test instrument 100 provides a reference signal to the DUT via a connector. The reference signal has known values that are input to the SCA application, such as a predetermined data pattern or voice pattern. The reference signal can be a digital signal. At 603, the test instrument 100 receives a signal output at the test point. For example, the test instrument 100 sends commands to the core framework 215 to send the output or a copy of the output at the test point to the test instrument 100. The signal output at the test point can be a digital signal. For example, the test point 701 is created at the output of the vocoder. The output of the vocoder includes digital audio samples that comprises real numbers that represent encoded voice. The samples may be sent to the test instrument 100 via the port 103A responsive to the commands previously sent to the core framework 215 from the test instrument 100 to provide a copy of the output of the vocoder to the test instrument 100. At 604, the test instrument displays and analyzes the signals output at the test point. For example, the test instrument 100 analyzes digital signals that are the samples, and plots the data. The plot may be shown on the display 106. Also, the plot of the samples may be compared to a predetermined plot of what the samples should be, referred to as a predetermined output test point signal. The predetermined output test point signal may be a predetermined output of a component at a test point that represents the output if the component is operating properly, such as within predetermined tolerances. For example, the vocoder shown in FIGS. 3 and 7 is a voice codec that analyzes and synthesizes the human voice signal for audio data compression, multiplexing, voice encryption or voice transformation. The test instrument 100 provides a reference signal comprised of a predetermined voice signal to the vocoder, such as discussed above with respect to FIG. 5. The test instrument 100 also stores a predetermined output test point signal that represents that output of the vocoder if the vocoder is operating properly. The test instrument 100 may receive the samples of the output of the vocoder at the test point 701 which is the actual output of the vocoder responsive to providing the reference signal as input the vocoder. The test instrument 100 compares the samples to the predetermined output test point signal to identify differences. The differences can be displayed on the test instrument 100, and a bit error rate may be determined from the differences and displayed on the test instrument 100.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A test instrument to test a Software Communications Architecture (SCA) device, the test instrument comprising:
   a processor;
   a data storage to store machine readable instructions;
   a display; and
   at least one port connectable to an SCA device under test (DUT),
   wherein the processor is to execute the machine readable instructions to:
     generate a graphical user interface (GUI) on the display that includes a representation of an SCA application executing in an embedded computing communication system of the SCA DUT, wherein the representation shows software application components of the SCA application and connections between the software application components;
     receive, via the GUI, a user selection of a test point to be created in the SCA application between a plurality of the software application components of the SCA application;
     determine a software application component of the plurality of software application components that provides an output comprised of a signal or data for the user-selected test point;
     automatically create, in the representation of the SCA application shown in the GUI, the test point for the output of the determined software application component;
     provide a reference signal to the SCA DUT via the at least one port to test the SCA application at the test point while the SCA application is executing on the SCA DUT;
     receive the signal or the data that is output at the test point via the at least one port; and
     display the signal or the data on the display.

2. The test instrument of claim 1, wherein to generate the GUI on the display that includes the representation of the SCA application, the processor is to execute the machine readable instructions to:
   retrieve descriptor Ides with metadata describing the software application components of the SCA application from the SCA DUT; and
   generate the representation from the descriptor files.

3. The test instrument of claim 2, wherein the selection of the test point comprises a location in the representation of the SCA application.

4. The test instrument of claim 2, wherein the test point is an intermediate test point between the plurality of software components.

5. The test instrument of claim 1, wherein the processor is to execute the machine readable instructions to:
   create the test point in the SCA application,
     wherein to create the test point in the SCA application, the processor is to execute the machine readable instructions to store test point metadata describing the test point, such that data can be gathered and redirected or copied from the test point in the SCA application of the SCA DUT, and transmitted to the test instrument.

6. The test instrument of claim 1, wherein the processor is to execute the machine readable instructions to:
   compare the signal or data that is output at the test point with a predetermined test point output, wherein the predetermined test point output represents an output of the test point if the SCA DUT or one or more application components of the SCA DUT associated with the test point are operating within predetermined tolerances.

7. The test instrument of claim 6, wherein the processor is to execute the machine readable instructions to:
   display differences between the signal or data that is output at the test point and the predetermined test point output.

8. The test instrument of claim 1, wherein the at least one port comprises a wired or wireless port.

9. The test instrument of claim 1, wherein the SCA DUT comprises a software defined radio.

10. The test instrument of claim 1, wherein the SCA application comprises a voice application or a data application that wirelessly transmits or receives voice or data.

11. A test instrument to test a Software Communications Architecture (SCA) device, the test instrument comprising:
   a processor;
   a data storage to store machine readable instructions executable by the processor;
   a display; and
   at least one port connectable to an SCA device under test (DUT),
   wherein the processor is to execute the machine readable instructions to:
     send a first command to the SCA DUT via the at least one port to retrieve descriptor tiles from the SCA DUT that describe SCA components of an SCA application hosted on the SCA DUT;
     parse the descriptor files to determine the SCA components of the SCA application and how the components are interconnected;
     generate a graphical user interface (GUI) on the display that includes a representation of the SCA application based on the parsed descriptor files, wherein the representation shows the SCA components and connections between the SCA components;

receive, via the GUI, a user selection of a test point to be created in the SCA application between a plurality of the SCA components;

determine a SCA component of the plurality of SCA components that provides an output for the user-selected test point;

automatically create, in the representation of the SCA application shown in the GUI, the test point for the output of the determined SCA component;

provide a reference input signal to the SCA DUT via the at least one port;

receive a test point output signal via the at least one port, wherein the test point output signal comprises samples of a signal output from the test point responsive to the reference input signal being provided as an input to the SCA application or as an input to the determined SCA component; and compare the samples to a predetermined output test point signal to identify differences.

12. The test instrument of claim 11, wherein the processor is to transmit a second command to the SCA DUT, the second command including an instruction to the SCA DUT to provide the test point output signal to the test instrument.

13. The test instrument of claim 11, wherein the SCA DUT comprises a software defined radio (SDR) complying with an SCA standard, and the SCA application is software of the SDR running on a hardware platform of the SCA DUT.

14. The test instrument of claim 13, wherein the test point comprises an output of one of the SCA components that is connected to an input to another one of the SCA components, and the test point output signal is different than a signal output from an antenna of the SDR.

15. A processor-implemented method for testing a Software Communications Architecture (SCA) device, the method comprising:

generating a graphical user interface (GUI) on a display that includes a representation of an SCA application executing on a SCA DUT, wherein the representation shows software application components of the SCA application and connections between the software application components;

receiving, via the GUI, a user selection of a test point to be created in the SCA application between a plurality of the software application components of the SCA application;

determining, by a processor, a software application component of the plurality of software application components that provides an output for the user-selected test point;

automatically creating, in the representation of the SCA application shown in the GUI, the test point for the output of the determined software application component;

instructing the SCA DUT to provide a test point output signal to the test instrument, wherein the test point output signal comprises a digital output signal from the test point during execution of the SCA application; and displaying or analyzing the test point output signal at the test instrument.

16. The processor-implemented method of claim 15, wherein the displaying or the analyzing of the test point output signal at the test instrument comprises:

comparing the test point output signal to a predetermined output test point signal to identify differences.

* * * * *